United States Patent [19]

Idel et al.

[11] Patent Number: 4,900,808

[45] Date of Patent: Feb. 13, 1990

[54] PROCESS FOR THE PRODUCTION OF HIGH MOLECULAR WEIGHT, OPTIONALLY BRANCHED POLYARYLENE SULPHIDES IN POLAR SOLVENT AND LACTAM

[75] Inventors: Karsten Idel, Krefeld; Edgar Ostlinning, Duesseldorf; Dieter Freitag, Krefeld, all of Fed. Rep. of Germany

[73] Assignee: Bayer Aktiengesellschaft, Leverkusen, Fed. Rep. of Germany

[21] Appl. No.: 933,078

[22] Filed: Nov. 20, 1986

Related U.S. Application Data

[63] Continuation of Ser. No. 761,370, Aug. 1, 1985, abandoned.

[51] Int. Cl.[4] .............................................. C08G 75/14
[52] U.S. Cl. .................................................... 528/388
[58] Field of Search ......................................... 528/388

[56] References Cited

U.S. PATENT DOCUMENTS

| | | | |
|---|---|---|---|
| 4,490,522 | 12/1984 | Kawabata et al. | 528/388 |
| 4,501,884 | 2/1985 | Ostlinning et al. | 528/388 |
| 4,525,579 | 6/1985 | Idel et al. | 528/388 |

*Primary Examiner*—Harold D. Anderson
*Attorney, Agent, or Firm*—Connolly and Hutz

[57] ABSTRACT

The invention relates to a process for the production of high molecular weight, optionally branched polyarylene sulfides from alkali sulfides and aromatic dihalogen compounds, in which the reaction is carried out in a polar solvent, such as an N-alkyl lactam, containing from 0.5 to 100 mole %, based on the moles of aromatic dihalogen compound, of a lactam.

21 Claims, No Drawings

PROCESS FOR THE PRODUCTION OF HIGH MOLECULAR WEIGHT, OPTIONALLY BRANCHED POLYARYLENE SULPHIDES IN POLAR SOLVENT AND LACTAM

This application is a continuation of Ser. No. 761,370 filed Aug. 1, 1985, now abandoned.

This invention relates to a process for the production of high molecular weight, optionally branched polyarylene sulfides from alkali sulfide and aromatic halogen compounds, in which the reaction is carried out in a polar solvent, such as an N-alkyl lactam, containing from 0.5 to 100 mole %, based on the moles of aromatic dihalogen compound, of a lactam.

Polyarylene sulfides and their production are known (cf. for example US-PS Nos. 2,513,188, 3,117,620, 3,354,129, 3,524,835, 3,790,536, 3,839,301, 4,048,259, 4,038,260, 4,038,261, 4,038,262, 4,056,515, 4,060,520, 4,064,114, 4,116,947 and 4,282,347; DE-AS Nos. 24 53 485 and 24 53 749 and DE-OS Nos. 26 23 362, 26 23 363, 26 23 333, 29 30 797, 29 30 710, 30 19 732, 30 30 488.

A number of these publications mention the addition of inorganic or organic salts during the production process to reduce melt flow in the polymer or rather to increase the melt viscosity of the polyphenylene sulfides obtained. It is only if their melt viscosity is high enough that polyphenylene sulfides can be thermoplastically processed, for example into injection moldings, films and fibers. Unless the above-mentioned salts are added, the polyphenylene sulfides obtained can only acquire the necessary low melt flow by separate and additional post-condensation or curing.

The salts used in the above-mentioned publications include, for example, alkali carboxylates (DE-OS 24 53 749), lithium halides or alkali carboxylates (DE-OS 26 23 362), lithium chloride or lithium carboxylate (DE-OS 26 23 363), alkali carbonates in combination with alkali carboxylates (US-PS 4 038 359), lithium acetate (DE-OS 26 23 333), trialkali phosphates (DE-OS 29 30 710), trialkali phosphonates (DE-OS 29 30 797), alkali fluorides (DE-OS 30 19 732), alkali sulfonates (US-PS 4,038,260), lithium carbonate and lithium borate (US-PS 4,038,518).

In addition, it is known from DE-OS 31 20 538 that polyarylene sulfides having high melt viscosities can be obtained by addition of N,N-dialkyl carboxylic acid amides.

The use of polar solvents for the production of polyarylene sulfides is known and is described in the above-mentioned publications.

Lactams are also mentioned as solvents. However, where lactams, such as for example pyrrolidone and ε-caprolactam, are used as the solvents, the p-polyphenylene sulfides obtained show unsatisfactory properties, i.e. high melt flow and low melt viscosity, and cannot be thermoplastically processed without curing.

It has now been found that, providing small quantities of lactam are present in the reaction mixture, it is possible to obtain polyarylene sulfides having high melt viscosity which may be thermoplastically processed directly, i.e. without any need for separate curing.

Compared with known processes which use pure N-alkyl lactams as solvent, products having higher melt viscosities are obtained in the process according to the invention if the reaction is carried out in accordance with the invention in a polar solvent and preferably in an N-alkyl lactam containing from 0.5 to 100 mole %, based on the moles of aromatic dihalogen compound, of a lactam.

It is known that the addition of aromatic polyhalogen compounds, particularly aromatic trihalogen compounds, as banching agents increases the melt viscosity of polyarylene sulfides.

Using the process according to the invention, it is possible to obtain polyarylene sulfides having high melt viscosities without having to use aromatic polyhalogen compounds.

Accordingly, the present invention relates to a process for the production of optionally branched polyarylene sulfides from (a) 50 to 100 mole % of aromatic dihalogen compounds corresponding to the following formula

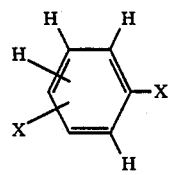

(I)

and 0 to 50 mole % of aromatic dihalogen compounds corresponding to the following formula

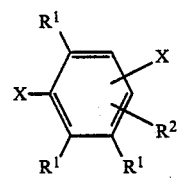

(II)

in which x represents halogen, such as chlorine or bromine, atoms in the meta- or para-position to one another and $R^1$ may be the same or different and represents hydrogen, $C_1$-$C_4$ alkyl, $C_5$-$C_{10}$ cycloalkyl, $C_6$-$C_{10}$ aryl, $C_7$-$C_{19}$ alkyl aryl, $C_7$-$C_{19}$ aryl alkyl, in addition to which two radicals $R^1$ in the ortho position to one another may be attached to form an aromatic or heterocyclic ring containing up to 3 heteroatoms, such as N, O, S, and one of the radicals $R^1$ is always different from hydrogen, and (b) 0 to 5 mole % and preferably 0.1 to 2.5 mole %, based on the sum of the aromatic dihalogen compounds of formulae I and II, of an aromatic trihalogen or tetrahalogen compound corresponding to the following formula $$ArX_n \qquad (III)$$

in which

Ar is an aromatic or heterocyclic radical,

X represents halogen, such as chlorine or bromine, and n is the number 3 or 4, and (c) alkali sulfides, preferably sodium or potassium sulfide, or mixtures thereof, preferably in the form of their hydrates or aqueous mixtures, optionally together with alkali hydroxides, such as sodium and potassium hydroxide, the molar ratio of (a+b) to c being in the range from 0.75:1 to 1.25:1, (d) optionally in the presence of known catalysts, for example alkali carboxylates, alkali phosphates, alkali phosphonates, alkali fluorides, alkali alkyl sulfonates or N,N-dialkyl carboxylic acid amides (DE-OS 31 90 538), characterized in that the reaction is carried out in a polar solvent, preferably an N-alkyl lactam, containing from 0.5 to 100 mole %, based on the moles of aromatic dihalogen compound, of a lactam.

The reaction time may be as long as 24 hours but is preferably between 2 and 18 hours. The reaction temperatures are in the range from 150° to 280° C.

The reaction may be carried out in various ways:

The alkali sulfides are preferably used in the form of their hydrates and aqueous mixtures or aqueous solutions. Dehydration may be partial or complete, for which purpose either the alkali sulfide is first dehydrated together with the organic solvent and the lactam, optionally using an azeotrope-forming or water-entraining agent, in a preliminary step carried out in the presence of the aromatic dihalogen and/or polyhalogen compound. It is also possible to dehydrate the entire reaction mixture using the aromatic dihalogen and polyhalogen compounds as azeotrope-forming agents.

If dehydration is only partial, it should be carried out under pressure to reach the necessary reaction temperatures. The alkali sulfides may be separately dried on their own by applying water and vacuum and then added to the reaction mixture. Depending on the initial nitrogen pressure, the pressure may be as high as 100 bar but is generally between 2 and 20 bar.

If the alkali sulfides are completely dehydrated, which is preferably carried out in the presence of all the reactants and with the aromatic dihalogen and polyhalogen compounds as water entraining agents, the reaction may be carried out in the absence of pressure or under a pressure of up to about 3 bar. Higher pressures of up to 50 bar may be applied to obtain higher reaction temperatures above the boiling point of the solvent or of the mixture of solvent and aromatic dihalogen and polyhalogen compounds.

Complete dehydration of all water-containing reactants is recommended for the process according to the invention.

The reactants may be added in various ways.

It is possible directly to add all the reactants together, although it is preferred to add one or more of the reactants continuously, accompanied by dehydration. In this way, it is possible to control the progress of the reaction and to minimize the residence time of the water in the reaction mixture.

By comparison, for example, with the process according to DE-OS 32 43 185, where the water is also removed from the reaction, lighter polyarylene sulfides of greater impact strength are obtained by the process according to the invention, giving off fewer gases on melting and thus being less corrosive.

The reaction mixture may be worked up and the polyarylene sulfides isolated by known methods.

The polyarylene sulfide may be separated off from the reaction solution by known methods, for example by filtration or by centrifuging, either directly or, for example, after the addition of water and/or dilute acids or organic solvents with little dissolving effect on polyarylene sulfides. Separation of the polyarylene sulfide is generally followed by washing with water. Washing or extraction with other washing liquids, which may even be carried out in addition to or after washing with water, is also possible.

The polyarylene sulfide may also be recovered, for example, by distilling off the solvent and washing as described above.

Suitable alkali sulfides are, for example, sodium and potassium sulfide. The alkali sulfides may also be obtained from $H_2S$ and alkali hydroxides or from the hydrogen sulfides and alkali hydroxides.

Depending on the amount of alkali hydrogen sulfide in the reaction solution, which is present as an impurity in the alkali sulfide, certain amounts of alkali hydroxide may be additionally introduced. Instead of the alkali hydroxides, it is also possible to add compounds which split off or form alkali hydroxides under the reaction conditions.

According to the invention, it is possible to use aromatic meta- and para-dihalogen compounds corresponding to formulae (I) and (II). The ratio of aromatic meta- to para-dihalogen compound may be up to 30:70.

To obtain thermoplastically processible polyarylene sulfides, it is particularly preferred to use aromatic p-dihalogen compounds.

If it is intended to produce branched polyarylene sulfides, at least 0.05 mole % of an aromatic trihalogen or tetra-halogen compound of formula (III) should be used.

Examples of aromatic dihalogen compounds corresponding to formula (I) which may be used in accordance with the invention are p-dichlorobenzene, p-dibromobenzene, 1-chloro-4-bromobenzene, 1,3-dichlorobenzene, 1,3-dibromobenzene and 1-chloro-3-bromobenzene. They may be used either individually or in admixture with one another. 1,4-dichlorobenzene and/or 1,4-dibromobenzene are particularly preferred.

Examples of aromatic dihalogen compounds corresponding to formula (II) which may be used in accordance with the invention are 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene and 1-cyclohexyl-3,5-dichlorobenzene. They may be used either individually or in admixture with one another.

Examples of aromatic trihalogen and tetrahalogen compounds corresponding to formula (III) suitable for use in accordance with the invention are 1,2,3-trichlorobenzene, 1,2,4-trichlorobenzene, 1,2,4-tribromobenzene, 1,3,5-trichloro-2,4,5-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobiphenyl, 1,3,5-trichlorotriazine.

Generally, any polar solvent which guarantees adequate solubility of the organic and, optionally, inorganic reactants under the reaction conditions may be used for the reaction. However, the solvents used are preferably cyclic ureas and, more preferably, N-alkyl lactams.

N-alkyl lactams are those of $C_3$–$C_{11}$ amino acids optionally substituted on the carbon chain which are inert under the reaction conditions.

The N-alkyl lactams used are, for example, N-methyl caprolactam, N-ethyl caprolactam, N-isopropyl caprolactam, N-isobutyl caprolactam, N-propyl caprolactam, N-butyl caprolactam, N-cyclohexyl caprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-isobutyl-2-piperidone, N-methyl-6-methyl-2-piperidone, N-methyl-3-ethyl-2-piperidone.

Mixtures of the above-mentioned solvents may also be used.

In the context of the invention, lactams are lactams of $C_3$–$C_{15}$ amino acids optionally substituted on the carbon chain which are inert under the reaction conditions.

Aliphatic lactams which may also contain aromatic groups are preferred. The following lactams for example may be used, optionally in admixture: 2-pyrrolidone, ($\gamma$-butyrolactam), 5-methyl-2-pyrrolidone, 5-ethyl-2-pyrrolidone, 2-piperidone, ($\delta$-valerolactam), 6-methyl-2-piperidone, 6-cyclohexyl-2-piperidone, $\epsilon$-caprolactam, $\omega$-amino-oenanthic acid lactam, $\omega$-aminocaprylic acid lactam, $\omega$-aminolauric acid lactam, $\omega$-aminohexadecanoic acid lactam, 1-methyl-5-homopiperazinone, 5-ethoxy-2-pyrrolidone, 5-benzyl-2-pyrrolidone, 5,5-dimethyl-6-methoxy-2-piperidone.

The polyarylene sulfides according to the invention may be mixed with other polymers, such as pigments and fillers, for example graphite, metal powders, glass powder, quartz powder, glass fibers or carbon fibers, and may have the additives normally used for polyarylene sulfides, for example stabilizers or mold release agents, added to them.

In general, the melt flow index of polyarylene sulfides is measured in accordance with ASTM 1238-70 at 316° C. using a 5 kg weight and is expressed in g/10 minutes.

With high melt flow indices, however, this method of measurement can present difficulties on account of the high outflow rate of the polymer melt.

Because of this, the melt viscosity $\eta_m$ of the polymer melt (in Pa.s) is determined at 306° C. in dependence upon the shearing force $\tau$ (in Pa) using an Instron rotational viscosimeter.

In this way, it is possible to determine melt viscosity over a very wide range of from $10^{-1}$ to $10^7$ Pa.s. In the Instron rheometer, the polymer is fused between a fixed plate and a rotatable cone and the torque of the cone is determined. The melt viscosity can be calculated as a function of the shearing force from the torque, the angular velocity and the equipment data. An Instron model 3250 rheometer was used; diameter of the cone and the plate 2 cm.

The melt viscosity quoted is the melt viscosity measured at a shearing force $\tau$ of $10^2$ Pa.

It is also possible to analyse the polyarylene sulphides with chromatographic methods, to get informations about their molecular weight and the molecular weight distribution. Typical examples for such methods are for example high pressure liquid chromatography (HPLC), gel permeation-chromatography (GPC).

As the stationary phase may be used common commercial carrier materials, for example Li-Chroprep ®, Lobar ®, LiChrosorb ®, LiChrospher ®, Perisorb ®, Hibar ®, Fractogel ®, Fractosil ®, Ultrastyragel ®, Microstyragel ®, Zorbax ®, Bondagel ® and Shodex ®.

As solvents and eluents may be used common solvents and diluents. These solvents and diluents should dissolve the polymers sufficient. Examples are 1-chloronaphthalene, diphenyl, N-methyl-pyrrolidone, N-cyclohexyl-pyrrolidone, N-methyl-piperidone, N-methyl-caprolactame, N-methyllaurinelactam, sulfolane, N,N'-dimethyl-imidazolidone, N,N'-dimethyl-piperazinone, hexamethyl-phosphoric-acid-triamide (NMP), 1-methyl-1-oxaphospholane and mixtures thereof.

It is possible to calibrate the analytical methods by absolute or relative standards. As reference substances for a relative calibration, usual polymers may be used as standard, for example, polystyrene, polyethylene, polyethylene-terephthalate, polybutylene-terephthalate, polyesters such as aromatic polyesters, polycarbonates, polyamides such as PA6, PA66, PA11, polysulfones and polyethersulfones.

The chromatography for the analytical determination of the molecular weights or the molecular weight distribution can be carried out at various pressures from about 1 to 10 bar.

The chromatography can be carried out within a wide temperature range from about 20° to 250° C.

Further it is possible for improvement purposes to add to the sample, which has to be analyzed, substances such as alkali halogenides, alkaline earth halogenides, phosphonium- or ammonium compounds.

By the interpretation of the so obtained analytical status, the weight average molecular weight $M_w$ can be determined.

The weight average molecular weight $M_w$ is from 25,000 to 500,000, preferably from 25,000 to 380,000, more preferably from 25,000 to 300,000, mostly preferably from 25,000 to 150,000.

By the inventive process polyarylene-sulphides with a melt viscosity of $\eta_m$ 20 to 500,000 Pa.s and an average weight relative molecular weight $M_w$(rel) from 25,000 to 500,000 characterized in that the melt viscosity $\eta_m$ and the average weight of the relative molecular weight $M_w$ behave $$\lg \eta_m = 3.48 \cdot \lg M_w(\text{rel}) - 14.25 \pm 0.1.$$

Preferably polyarylene-sulphides are characterized in that $\eta_m$ and $M_w$ behave $$\lg \eta_m = 3.48 \cdot \lg M_w(\text{rel}) - 14.25 \pm 0.05.$$

Immediately after isolation from the reaction mixture, the polyarylene sulfides according to the invention, preferably the p-polyarylene sulfides, generally have melt viscosities of $0.3 \times 10^3$ to $5 \times 10^6$ Pa.s and preferably from $1.5 \times 10^3$ to $10^4$ Pa.s and good color properties. They may be directly processed by extrusion, extrusion blowing, injection molding or other standard processing techniques to form films, moldings and fibers. The products thus obtained may be used for the usual applications, for example as automobile components, accessories, electrical components, for example switches, electronic boards, components and apparatus resistant to chemicals and weathering such as pump housings and pump flywheels, etching baths, sealing rings, components of office machines and communications equipment, domestic appliances, valves, ballbearing components.

EXAMPLE 1

This Example describes by way of comparison the production of polyphenylene sulfide in accordance with US-PS 3,354,129.

129 g of sodium sulfide trihydrate (corresponding to 1 mole of Na$_2$S) and 300 g of N-methyl-2-pyrrolidone were combined in a stirrer-equipped autoclave. The mixture was purged with nitrogen and slowly heated to 202° C., a total of 19 ml of water distilling off. The mixture was then cooled to around 160° C. and 147 g of p-dichlorobenzene (=1 mole) in approx. 50 g of N-methyl-2-pyrrolidone added. The reaction mixture was then heated for 30 minutes to 245° C. under the initial nitrogen pressure of 2,5 bar, the pressure rising to 10 bar, and kept at that temperature for 3 hours. After cooling to room temperature, a gray solid is isolated and carefully washed with water to remove organic impurities.

After drying in vacuo at 80° C., 100.3 g (93%) of poly-p-phenylene sulfide having the following characteristics are obtained: melt viscosity $\eta_m$=4.5 Pa.s (for $\tau$=10$^2$ Pa). Thermoplastic processing is not possible without curing.

EXAMPLE 2

1110 g of N-methyl caprolactam, 323.5 g of sodium sulfide hydrate ($\hat{=}$2.45 moles), 28.0 g of 50% sodium hydroxide, 341.1 g of 1,4-dichlorobenzene ($\hat{=}$2.32 moles), 4.21 g of 1,2,4-trichlorobenzene (1 mole %, based on dichlorobenzene), 30.2 g of N,N-dimethylacetamide (15 mole %, based on Na$_2$S) and 4.44 g (0.035 mole) of ε-caprolactam are introduced under nitrogen into a 2 liter three-necked flask equipped with a thermometer, stirrer and a column with a distillate divider. The reaction mixture is slowly heated to boiling temperature. Water is separated off from the distilling azeotrope consisting of water and p-dichlorobenzene and p-dichlorobenzene is returned to the reaction vessel. After 2 hours, no more water can be detected either in the distillate or in the sump. After heating under reflux for another 9 hours, the product is isolated in the form of white fibers by precipitation in water, acidification, washing with water to remove electrolyte and drying. The product was identified by its melt viscosity $\eta_m$.

$\eta_m$=6.2×10$^3$ Pa.s (for $\tau$=10$^2$ Pa).

EXAMPLE 3

As Example 2, but with 1.68 g of 1,2,4-trichlorobenzene (0.4 mole %, based on dichlorobenzene as branching agent).

$\eta_m$=1.45×10$^3$ Pa.s (for $\tau$=10$^2$ Pa).

EXAMPLE 4

The branching agent, 1,2,4-trichlorobenzene, was not used in this Example.

$\eta_m$=3.2×10$^2$ Pa.s (for $\tau$=10$^2$ Pa).

EXAMPLE 5

The procedure was as in Example 2, except that 3.77 g of pyrrolidone were used instead of the 4.44 g of ε-caprolactam. A white PPS having the following melt viscosity after precipitation was obtained:

$\eta_m$=5.8×10$^3$ Pa.s (for $\tau$=10$^2$ Pa).

EXAMPLE 6

The procedure was as in Example 2, except that 8.74 g of lauric lactam were used instead of the 4.44 g of ε-caprolactam. $\eta_m$ of the p-polyphenylene sulfide obtained:

$\eta_m$=4.2×10$^3$ Pa.s (for $\tau$=10$^2$ Pa).

EXAMPLE 7

The procedure was as in Example 4 using 1110 g of N-methylcaprolactam, 323.5 g of sodium sulfide hydrate ($\hat{=}$2.45 moles), 2.4 g of 50% sodium hydroxide, 341.1 g of 1,4-dichlorobenzene ($\hat{=}$2.32 moles), 38.05 g of sodium acetate ($\hat{=}$20 mole %, based Na$_2$S) and 4.44 g (0.025 mole) of ε-caprolactam. 233.4 g of white polyphenylene sulfide having a melt viscosity $\eta_m$ of 3.0×10$^2$ Pa.s (for $\tau$=10$^2$ Pa) were obtained.

EXAMPLE 8

The procedure was as in Example 7, except that 29.4 g of ε-caprolactam were used and solutions of NMC (N-methylcaprolactam) and DCB (dichlorobenzene) and also sodium sulfide hydrate, ε-caprolactam and sodium acetate were combined and, at the same time, dehydrated. Melt viscosity $\eta_m$=3.5×10$^2$ Pa.s (for $\tau$=10$^2$ Pa).

A p-polyphenylene sulfide produced in accordance with Example 2 of DE-OS 32 43 189 (removal of the free water from the reaction, no addition of lactam) showed a darker color both before and after melting and gave off acidic, corrosive gaseous constituents on melting to a greater extent than the p-polyphenylene sulfides produced in accordance with Examples 7 and 8, i.e. in accordance with the invention. Melting was carried out at 320° C., the acidic gases were transferred with nitrogen as entraining gas into a washing bottle filled with 1 N sodium hydroxide solution and the sodium hydroxide used and neutralized was titrimetrically determined.

| | Color after precipitation (in H$_2$O) | Color after melting | Consumption in ml of 1N NaOH after melting for 30' at 320° C. |
|---|---|---|---|
| PPS (polyphenylene sulfide) according to Example 2 of DE-OS 32 43 189 | gray-white | black | 3.1 |
| PPS according to the present invention | | | |
| Example 7 | white | brownish | 2.4 |
| Example 8 | white | brownish | 2.2 |

We claim:
1. A process for the production of high molecular weight polyarylene sulphide or branched polyarylene sulphide which comprises reacting a mixture of components consisting essentially of:
(a) 50 to 100 mole % of an aromatic dihalogen compound corresponding to the following formula:

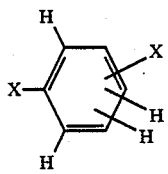

and 0 to 50 mole % of an aromatic dihalogen compound corresponding to the following formula:

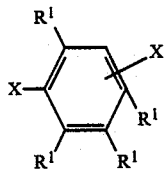

in which
X are halogen atoms in the meta- or para- position to one another; and each
$R^1$ is independently hydrogen, alkyl, cycloalkyl, aryl, alkylaryl, arylalkyl, or two groups $R^1$ in the orthoposition to one another attached together to form an aromatic or a nitrogen, oxygen or sulphur containing heterocyclic ring, with the proviso that at least one $R^1$ in not hydrogen and (b) 0 to 5 mole %, based on the sum of components (a) and (b), of an aromatic trihalogen or tetrahalogen compound corresponding to the following formula:

$$ArX^1_n$$

in which
Ar is an aromatic or heterocyclic group;
$X^1$ is a chlorine or bromine; and
n is the number 3 or 4, and (c) an alkali sulphide, where the molar ratio of (a+b) to c is in the range of from 0.85:1 to 1.15:1;
wherein said reaction is conducted in (1) a polar solvent which additionally contains 0.5 to 100 mole %, based on moles of aromatic dihalogen compounds, of (2) a lactam wherein the nitrogen atom of said lactam has one hydrogen substituent wherein (1) is other than (2).

2. A process as claimed in claim 1, wherein said lactam is an aliphatic lactam.

3. A process as claimed in claim 1, wherein said lactam is ε-caprolactam.

4. A process as claimed in claim 1, wherein the reaction is carried out in batches or continuously.

5. A process as claimed in claim 1, wherein said polar solvent is N-methyl-ε-caprolactam.

6. A process as claimed in claim 1, wherein component (b) is 1,2,4-trichlorobenzene.

7. A process as claimed in claim 1, wherein component (c) further comprises an alkali hydroxide.

8. A process as claimed in claim 7, wherein the alkali hydroxide is sodium hydroxide or potassium hydroxide.

9. A process as claimed in claim 1, wherein said polar solvent is an N-alkyl lactam.

10. A process as claimed in claim 1, wherein said polar solvent further comprises a reaction-accelerating catalyst.

11. A process as claimed in claim 1, where said lactam is an aliphatic lactam containing aromatic substitution on the aliphatic portion.

12. A process as claimed in claim 1, wherein said lactam is 2-pyrrolidone, (γ-butyrolactam), 5-methyl-2-pyrrolidone, 5-ethyl-2-pyrrolidone, 2-piperidone, (δ-valerolactam), 5-methyl-2-piperidone, 6-cyclohexyl-2-piperidone, ε-caprolactam, ω-amino-oenanthic acid lactam, ω-aminocaprylic acid lactam, ω-aminolauric acid lactam, ω-amino-hexadecanoic acid lactam, 1-methyl-5-homopiperidone, 5-ethoxy-2-pyrrolidone, 5-benzyl-2-pyrrolidone, or 5,5-dimethyl-6-methyoxy-2-piperidone.

13. A process as claimed in claim 12 wherein said polar solvent is an N-alkyl lactam.

14. A process as claimed in claim 9 wherein said polar solvent is N-methyl caprolactam, N-ethyl caprolactam, N-isopropyl caprolactam, N-isobutyl caprolactam, N-propyl caprolactam, N-butyl caprolactam, N-cyclohexyl caprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3,4,5 trimethyl-2-pyrrolidone, N-methyl-2-piperidone, N-ethyl-2-piperidone, N-isopropyl-2-piperidone, N-isobutyl-2-piperidone, N-methyl-6-methyl-2-piperidone, or N-methyl-3-ethyl-2-piperidone.

15. A process as claimed in claim 12 wherein said polar solvent is N-methyl caprolactam, N-ethyl caprolactam, N-isopropyl caprolactam, N-isobutyl caprolactam, N-propyl caprolactam, N-butyl caprolactam, N-cyclohexyl caprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3,4,5-trimethyl-2-pyrrolidone, N-methyl-2-piperidone, N-ethyl-2-piperidone, N-isopropyl-2-piperidone, N-isobutyl-2-piperidone, N-methyl-6-methyl-2-piperidone, or N-methyl-3-ethyl-2-piperidone.

16. A process for the production of a high molecular weight polyarylene sulphide or branched polyarylene sulphide which comprises reacting a mixture of components consisting essentially of:

(a) 50 to 100 mole % of an aromatic dihalogen compound corresponding to the following formula:

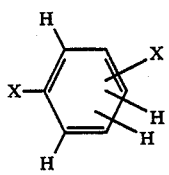

and 0 to 50 mole % of an aromatic dihalogen compound corresponding to the following formula:

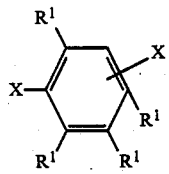

in which
.X ar halogen atoms in the meta- or para- position to one another; and each
$R^1$ is independently hydrogen, alkyl, cycloalkyl, aryl, alkylaryl, arylalkyl, or two groups $^1$ in the orthoposition to one another attached together to form an aromatic or a nitrogen, oxygen or sulphur containing heterocyclic ring, with the proviso that at least one $R^1$ is not hydrogen and (b) 0 to 5 mole %, based on the sum of components (a) and (b), of an aromatic trihalogen or tetrahalogen compound corresponding to the following formula:

$$ArX^1{}_n$$

in which

Ar is an aromatic or heterocyclic group;
$X^1$ is a chlorine or bromine; and
n is the number 3 or 4, and (c) an alkali sulphide, where the molar ratio of (a+b) to c is in the range of from 0.85:1 to 1.15:1;

(d) 1 to 100 mole %, based on the moles of alkali sulphide, of an N-dialkyl, carboxylic acid amide wherein said reaction is conducted in (1) a polar solvent which additionally contains 0.5 to 100 mole %, based on moles of aromatic dihalogen compounds, of (2) a lactam wherein the nitrogen atom of said lactam has one hydrogen substituent.

17. A process as claimed in claim 16 wherein component (d) is present in an amount of 1 to 25 mole %, based on the moles of alkali sulphide.

18. A process as claimed in claim 1, further comprising dehydrating said components which contain water and said sulphide and then reacting the mixture in the absence of pressure or under a low pressure.

19. A process as claimed in claim 1, wherein the components are combined individually or in the form of mixtures or solutions at temperatures $\geqq 200°$ C., for a time sufficient to dehydrate the reaction mixture, and then reacting the dehydrated mixture.

20. A process as claimed in claim 16, wherein the alkali sulphide is added to the reaction mixture in the form of a hydrate, an aqueous mixture or an aqueous solution.

21. A process as claimed in claim 16, wherein the alkali sulphide is sodium sulphide, potassium sulphide or mixtures thereof.

* * * * *